(12) United States Patent
Dietrich et al.

(10) Patent No.: US 10,118,574 B2
(45) Date of Patent: Nov. 6, 2018

(54) MODULAR DISTRIBUTOR FOR ELECTRICAL CONDUCTORS

(71) Applicant: Murrelektronik GmbH, Oppenweiler (DE)

(72) Inventors: Michael Dietrich, Mainhardt (DE); Thomas Ulrich, Auenwald (DE)

(73) Assignee: Murrelektronik GmbH, Oppenweiler (DE)

( * ) Notice: Subject to any disclaimer, the term of this patent is extended or adjusted under 35 U.S.C. 154(b) by 0 days.

(21) Appl. No.: 15/672,144

(22) Filed: Aug. 8, 2017

(65) Prior Publication Data
US 2018/0037177 A1 Feb. 8, 2018

(30) Foreign Application Priority Data
Aug. 8, 2016 (EP) ................................. 16001756

(51) Int. Cl.
| | |
|---|---|
| *H01R 13/74* | (2006.01) |
| *B60R 16/023* | (2006.01) |
| *H01R 9/26* | (2006.01) |
| *H01R 13/58* | (2006.01) |
| *H02B 1/20* | (2006.01) |
| *H01R 9/24* | (2006.01) |
| *H01R 31/00* | (2006.01) |

(52) U.S. Cl.
CPC ....... *B60R 16/0238* (2013.01); *H01R 9/2458* (2013.01); *H01R 9/2675* (2013.01); *H01R 13/582* (2013.01); *H01R 13/743* (2013.01); *H01R 31/005* (2013.01); *H02B 1/205* (2013.01)

(58) Field of Classification Search
CPC .... H01R 25/00; H01R 9/2675; B60R 16/0238
USPC ........................................................ 439/225
See application file for complete search history.

(56) References Cited

U.S. PATENT DOCUMENTS

| | | | | |
|---|---|---|---|---|
| 3,016,512 | A * | 1/1962 | Borchard | H01R 24/86 |
| | | | | 439/225 |
| 3,417,214 | A * | 12/1968 | Krehbiel | H01H 5/08 |
| | | | | 174/51 |
| 3,459,998 | A * | 8/1969 | Focarile | H05K 1/144 |
| | | | | 257/697 |
| 3,701,964 | A * | 10/1972 | Cronin | H01R 12/774 |
| | | | | 174/261 |

(Continued)

FOREIGN PATENT DOCUMENTS

| | | | |
|---|---|---|---|
| DE | 202004003118 U1 | 4/2004 | |
| WO | 0228159 A1 | 4/2002 | |

*Primary Examiner* — Neil Abrams
(74) *Attorney, Agent, or Firm* — Walter Ottesen, P.A.

(57) ABSTRACT

The invention relates to a modular distributor for incoming and outgoing electrical conductors. The modular distributor including at least a base module having a first electrical conductor, and a connecting module having a second electrical conductor, wherein at least a first core of the first electrical conductor contacts a second core of the second electrical conductor. For the achievement of a high degree of flexibility in installation, the base module is provided with at least two contact rods extending therefrom, wherein the connecting module is threaded onto the contact rods and the contact rods project through the connecting module. A contact rod forms the electrical connection between a first core of the first conductor and a second core of the second conductor.

16 Claims, 10 Drawing Sheets

(56) References Cited

U.S. PATENT DOCUMENTS

| | | | | |
|---|---|---|---|---|
| 3,740,697 | A | * | 6/1973 | Van Son ............... H01R 27/02 439/468 |
| 3,768,062 | A | * | 10/1973 | Michaels ............... H01R 12/68 439/225 |
| 3,786,208 | A | * | 1/1974 | Edwards ............... H01R 24/66 200/51 R |
| 3,874,764 | A | * | 4/1975 | Volinskie ............... H01R 25/00 439/404 |
| 4,012,093 | A | * | 3/1977 | Crane ............... H01R 12/777 361/750 |
| 4,056,299 | A | * | 11/1977 | Paige ............... H01R 4/4818 439/225 |
| 4,520,427 | A | | 5/1985 | Brotherton et al. |
| 4,526,432 | A | * | 7/1985 | Cronin ............... H01R 12/777 439/320 |
| 4,533,200 | A | * | 8/1985 | Wilson ............... H01R 4/2441 439/395 |
| 4,546,267 | A | * | 10/1985 | Urfirer ............... H01R 13/22 307/116 |
| 4,655,522 | A | * | 4/1987 | Beck, Jr. ............... H01R 13/114 439/224 |
| 5,543,982 | A | * | 8/1996 | Takagi ............... G11B 5/5521 360/99.08 |
| 6,038,130 | A | * | 3/2000 | Boeck ............... H01R 9/2675 361/729 |
| 6,083,025 | A | * | 7/2000 | Anbo ............... H01R 13/629 439/296 |
| 6,461,201 | B1 | * | 10/2002 | Maeda ............... H01R 13/6456 439/701 |
| 6,462,953 | B2 | * | 10/2002 | Tong ............... H01R 25/00 361/728 |
| 6,469,901 | B1 | * | 10/2002 | Costner ............... G06F 1/18 361/730 |
| 6,607,408 | B2 | * | 8/2003 | Milan ............... G06F 13/4095 361/732 |
| 6,692,310 | B2 | * | 2/2004 | Zaderej ............... H01R 13/514 439/541.5 |
| 7,167,372 | B2 | * | 1/2007 | Mori ............... G06F 1/1632 361/731 |
| 7,513,038 | B2 | * | 4/2009 | Koh ............... H01R 13/6205 29/825 |
| 7,899,970 | B2 | * | 3/2011 | Mori ............... G06F 13/4022 710/303 |
| 8,622,753 | B2 | * | 1/2014 | Balzano ............... H01R 13/22 439/225 |
| 8,708,712 | B2 | * | 4/2014 | Iida ............... H01R 12/79 439/67 |
| 8,770,992 | B2 | * | 7/2014 | Yu ............... H01R 11/11 439/76.1 |
| 8,920,185 | B2 | * | 12/2014 | Pai ............... H01R 13/62 361/679.02 |
| 9,124,056 | B1 | | 9/2015 | Lewis, Jr. |
| 2009/0208168 | A1 | * | 8/2009 | Ishikawa ............... H01R 13/113 385/14 |
| 2018/0037177 | A1 | * | 2/2018 | Dietrich ............... B60R 16/0238 |

* cited by examiner

MODULAR DISTRIBUTOR FOR ELECTRICAL CONDUCTORS

CROSS REFERENCE TO RELATED APPLICATION

This application claims priority of European patent application no. 16 001 756.2, filed Aug. 8, 2016, the entire content of which is incorporated herein by reference.

FIELD OF THE INVENTION

The invention relates to a modular distributor for incoming and outgoing electrical conductors.

BACKGROUND OF THE INVENTION

A distributor includes a base module having a first electrical conductor as an incoming line, and a connecting module having a second electrical conductor as an outgoing line. At least a first core of the first electrical conductor is bonded with a second core of the second electrical conductor, wherein electrical connection is generally provided via a contact clamp.

If, in production installations, a plurality of actuators, sensors or similar components are connected to a central control system, this is associated with a high degree of installation complexity. In many cases, distribution boxes are employed, in which the cores of incoming lines are connected to the cores of outgoing lines via contact clamps.

Prefabricated distributors are also known, incorporating for example, circular plug sockets. Active or passive elements for connection are connected via prefabricated conductors with circular plugs. Unused sockets on the distributor remain vacant, specifically where, on a connection point, connections of different types are to be provided.

SUMMARY OF THE INVENTION

It is an object of the invention to provide a modular distributor for incoming and outgoing electrical conductors, which provides a high degree of variability and is simple to wire.

According to the invention, this object can, for example, be achieved by a modular distributor for incoming and outgoing electrical conductors including at least a base module having a first electrical conductor, and a connecting module having a second electrical conductor, wherein at least a first core of the first electrical conductor is bonded with a second core of the second electrical conductor. The base module is provided with at least two contact rods, wherein the connecting module is fitted onto the contact rods, and the contact rods project through the connecting module. The connecting module has a housing with a guide sleeve, wherein a guide sleeve is arranged for axial displacement on a contact rod, and at least one guide sleeve on the housing is configured as an electrical contact clamp. A contact rod forms the electrical connection between a first core of the first conductor and a second core of the second conductor.

The base module is provided with at least two contact rods, wherein a connecting module is mechanically fitted to the contact rods. The contact rods project through the connecting module, wherein one contact rod forms the electrical connection between a first core of a first conductor and a second core of a second conductor. The contact rods thus form not only an electrical connection between the conductors to be wired-up, but simultaneously also form a mechanical supporting structure for the connection of one or more connecting modules to the base module.

Specifically, if a plurality of contact rods are provided on the base module, the modular distributor can be configured such that, for each connecting module, specific contact rods form the electrical connection between the cores of an incoming conductor and the cores of an outgoing conductor on the connecting module.

Appropriately, the connecting modules are mechanically guided on at least one of the contact rods, such that a mechanical orientation of a connecting module relative to the base module is ensured.

One contact rod can project through a plurality of connecting modules such that, for example, one contact rod projects through one or two modules, and is only bonded with the core of an outgoing conductor in a third connecting module.

A connecting module appropriately has a housing with a guide sleeve which, advantageously, is integrally configured with the housing; for example, the housing and the guide sleeve can be configured as a one-piece plastic molding. After the fitting of the connecting module to the contact rods, the guide sleeve is arranged for axial displacement on at least one of the contact rods, and thus permits the straightforward threading of the connecting modules onto the contact rods. Preferably, the connecting module is mechanically guided and maintained in position on all the contact rods of the base module.

Appropriately, at least one guide sleeve on the housing can be configured as an electrical contact clamp. Appropriately, the guide sleeves are provided with an electrical contact clamp, which is guided on the contact rods for the conduction of the supply voltage.

In an advantageous further embodiment, the housing of the connecting module is configured as a cup-type housing having a base, wherein the electrical contact of one core of the electrical conductor of the connecting module is formed with a contact rod within the cup-type housing. The cup-type housing is open at its top end, in the interests of ease of assembly. The contact rods, the contacts to be fitted and the guide sleeves are freely accessible from the top end.

The cup-type housing of the connecting module is advantageously closed by the next adjoining connecting module in sequence on the contact rod. The terminal compartment of a connecting module is thus specifically closed by a base of the next adjoining connecting module in sequence on the contact rod and—with a corresponding configuration—can permit the achievement of high protection ratings of over IP65.

For the achievement of a maximum protection rating of IP67 to IP69K, a seal is arranged between one connecting module and the next adjoining connecting module in sequence on the contact rod. The seal is configured to provide an axial sealing in the upward direction of the distributor. Optionally, the seal can be configured such that, by the application thereof to the inner wall of the receiving space of a receiving module, a radial seal between adjoining connecting modules is also formed.

In a further embodiment, the housing of the connecting module, in at least one side of the housing, incorporates a receiving window for the accommodation of a connecting element, wherein the connecting element is fitted, preferably during the production process. A connecting module has a connecting line, a screw connection for a connecting line and/or a plug-in connection for a connecting line. In another configuration, the modules can be configured such that a receiving window for a connecting element is provided as a push-out surface, thereby permitting the user to determine the position of the receiving window, and the number of receiving windows to be opened, in situ.

The electrical connection between a core of the electrical conductor of the connecting module and one of the contact rods on the base module is advantageously configured in the form of a spring contact clamp. The spring contact clamp is configured such that it is maintained in position for axial displacement on the contact rod. Specifically, the contact clamp is configured as a spring-cage connector, which is penetrated by a contact rod.

In a further embodiment, the contact rods are arranged on a base of the base module, wherein the cores of the first conductor, for example, an incoming conductor, are electrically connected below the base. To this end, a contact plate is appropriately provided, upon which the ends of the contact rods are electrically bonded.

The base module has a central axis, around which the contact rods are arranged. The arrangement is configured such that, a plurality of outer contact rods with an outer radial clearance to the central axis are provided on the base of the base module. Moreover, a plurality of inner contact rods are arranged with an inner radial clearance to the central axis. The radial clearance is selected such that the inner radial clearance is smaller than the outer radial clearance.

The arrangement of the contact rods is moreover configured such that the connecting module can be accurately threaded onto the contact rods by rotation through 90° in each case. The configuration is advantageously arranged such that rotational symmetry is given by rotation through a respective angle of 90°. A connecting module can thus be accurately fitted to the base module in four rotational positions, respectively.

Preferably, all the inner contact rods have an equal inner radial clearance to the central axis, and all the outer contact rods have an equal outer radial clearance to the central axis. The longitudinal axes of the inner or outer contact rods are thus appropriately arranged on a common diametral circle.

The outer contact rods form electrical supply conductors, and are configured with a larger diameter than the inner contact rods, which are employed as electric signal lines.

The contact rods are appropriately formed of an electrically-conductive material; the provision of the contact rods with a conductive outer cladding may be sufficient.

In order to permit the visible detection of the bonding of a contact rod with a contact clamp which is fitted thereto, the contact rods can advantageously be coated with a—specifically colored—contact lacquer. Upon the fitting of a contact clamp, this contact lacquer is peeled away, such that the user, upon the fitting for example, of a third connecting module, can detect from the visual state of the contact rods which of the contact rods have already been bonded, and which have not.

The cross-sectional shape of the contact rods is preferably cylindrical; other cross-sectional shapes, including quadratic, hexagonal or similar, can be advantageous.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
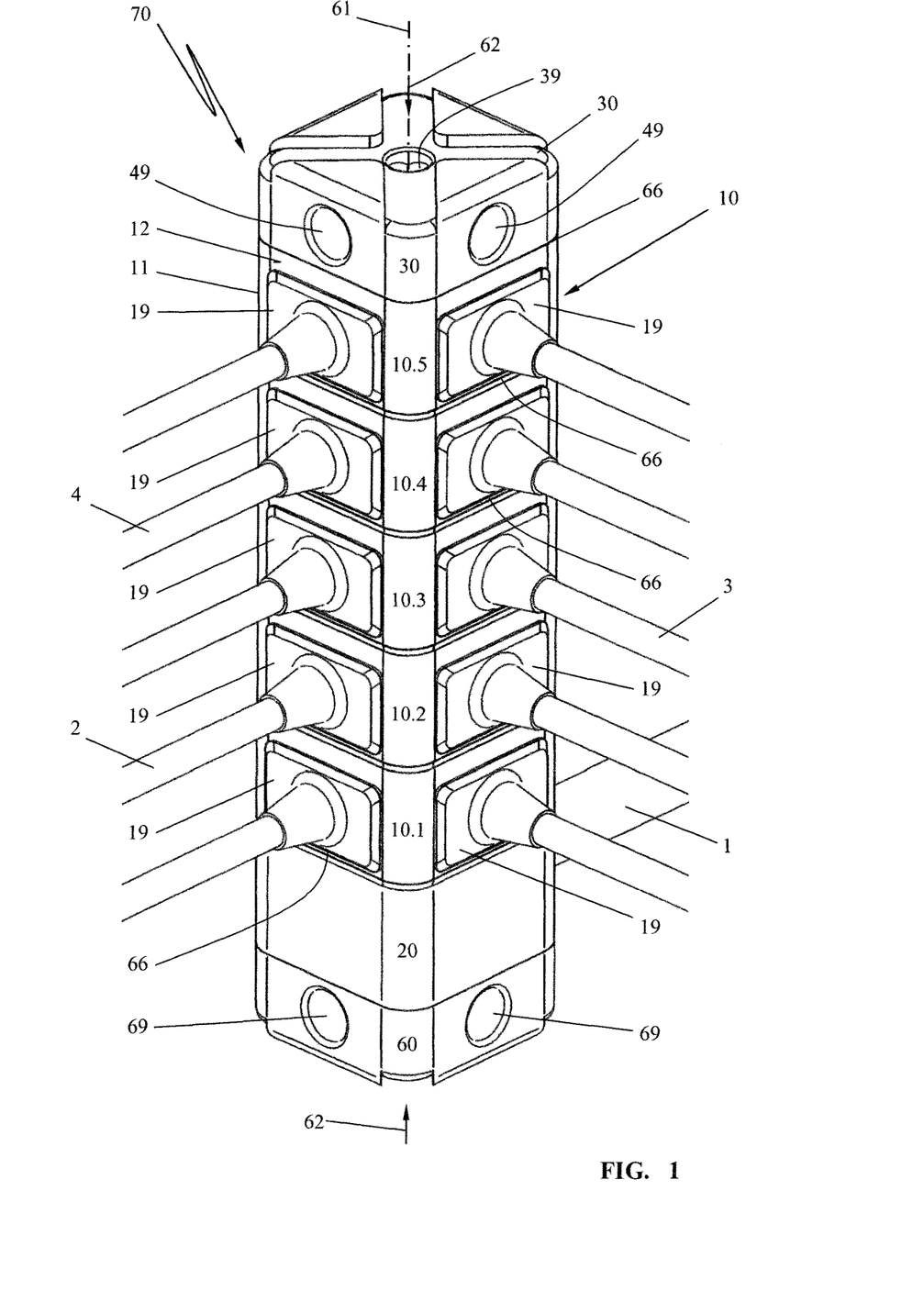
FIG. 1 is a perspective view of a distributor in the form of a tower having a plurality of incoming lines and outgoing lines.

The distributor 70 shown in FIG. 1 includes a base module 20, having one or more connecting modules 10 fitted to the base module 20. In the embodiment represented, five connecting modules 10.1, 10.2, 10.3, 10.4 and 10.5 are arranged on the base module 20. A cover module 30 is fitted to the final connecting module 10.5 in the sequence as a terminal element. The base module 20 is appropriately mounted on a pedestal module 60. For the attachment of the individual connecting modules 10, both relative to each other and to the base module, the distributor can be penetrated by a tie-rod 61; the tie-rod 61 can be configured as a threaded rod, a tension bolt or similar. The tie-rod 61 translates a force through the mutually-stacked connecting modules 10.1, 10.2, 10.3, 10.4 and 10.5, the base module 20 and the cover module 30, in the direction of the arrows 62 and 63, via which the modules are securely compressed against each other in the axial direction.

As described hereinafter, seals 66 are arranged between the modules, via which a dust- and fluid-tight bond is provided. The distributor according to the invention can achieve protection ratings up to IP65, IP68, or even IP69K.

The distributor 70 has an incoming conductor as a first electrical conductor 1, and at least one outgoing conductor as a second electrical conductor 2. As shown in FIG. 1, a single connecting module can include more than one incoming or outgoing electrical conductor; for example, in the schematic representation shown in FIG. 5, the connecting module 10.2 is represented with one outgoing conductor 2, the connecting module 10.3 with one conductor 3, and the connecting module 10.4 with one conductor 4.

A housing 11 of a connecting module 10, on each of its housing sides 12, can be provided with an incoming conductor or an outgoing conductor. In the embodiment represented, on one connecting module 10, up to four incoming/outgoing electrical conductors are connectable on the distributor 70. In the distributor 70 according to FIG. 1, five connecting modules 10.1 to 10.5 are provided, such that for example, a maximum of twenty incoming and outgoing conductors 2, 3, 4 can be connected on an incoming source conductor, the conductor 1. The number of connecting modules in a tower can be selected according to the site of use and the desired number of electrical connections. The number of five connecting modules 10.1 to 10.5 represented in the embodiment of a tower is shown for exemplary purposes. Fewer than five connecting modules, or more than five, for example, eight or more connecting modules, can also be provided.

Figure 2:
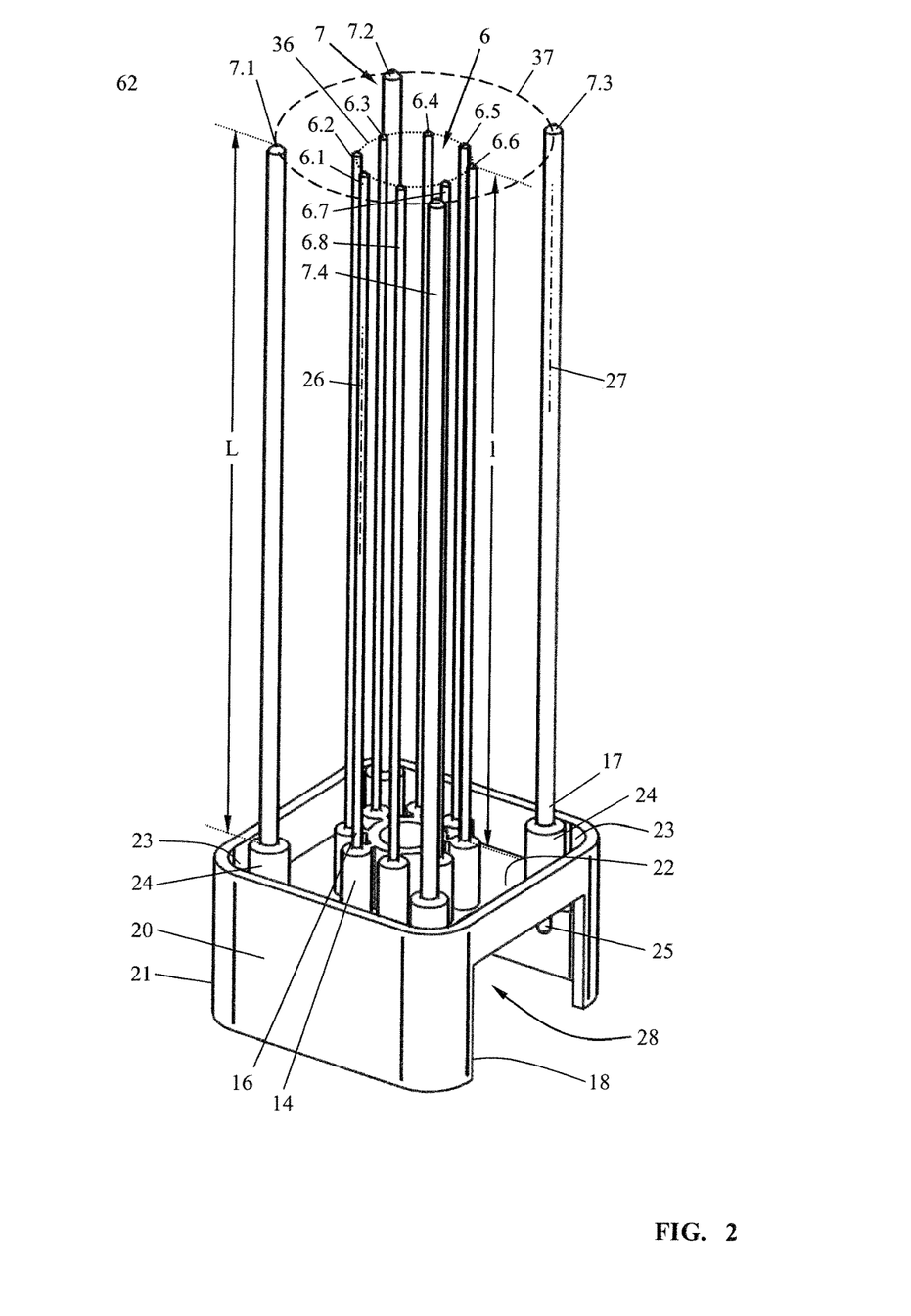
FIG. 2 shows a perspective view of a base module of the distributor according to FIG. 1.

The base module 20 is represented in FIG. 2, and essentially includes a base housing 21 having a base 22, to which a plurality of contact rods 6 or 7 are fitted. In the embodiment represented, four outer contact rods 7.1, 7.2, 7.3, 7.4, and eight inner contact rods 6.1, 6.2, 6.3, 6.4, 6.5, 6.6, 6.7, 6.8 are provided. As shown in FIG. 2, the contact rods 6, 7, with their longitudinal axes 26, 27, are perpendicularly aligned to the base 22 of the base housing 21. In an overhead view, the base housing 21 has an approximately quadratic outline, and preferably has an exactly quadratic outline. In each housing corner 23 of the base housing 21, a retaining dome 24 is arranged. The end sections 17 of the contact rods 7 facing the base module 20 are fitted to the retaining domes 24, and permanently secured therein. As shown in FIG. 2, an end section 17 of a contact rod 7 penetrates the base 22, and ends at a termination 25 in a terminal compartment 28 of the base module 20.

The end sections 16 of the contact rods 6 are fitted to the retaining domes 24 which are configured in the base housing 21 of the base module 20. In the same way as the end sections 17 of the contact rods 7, the end sections 16 penetrate the base 22 of the base module 20, and end with their terminations 15 (FIG. 5) within the terminal compartment 28 of the base housing 21 of the base module 20.

In FIG. 2, it is clear that the contact rods 6.1, 6.2, 6.3, 6.4, 6.5, 6.6, 6.7, 6.8 are of an equal axial length 1, and the contact rods 7.1, 7.2, 7.3, 7.4 are of an equal axial length L. Appropriately, the outer contact rods 7.1, 7.2, 7.3, 7.4 can be configured with a longer length L. The threading of a connecting module 10 onto the contact rods can be facilitated accordingly. The centrally-arranged contact rods 6.1, 6.2, 6.3, 6.4, 6.5, 6.6, 6.7, 6.8 are advantageously configured with a smaller diameter d than the outer contact rods 7.1, 7.2, 7.3, 7.4 arranged in the housing corners 23 of the base module 20. This is specifically represented in FIG. 3.

Figure 3:
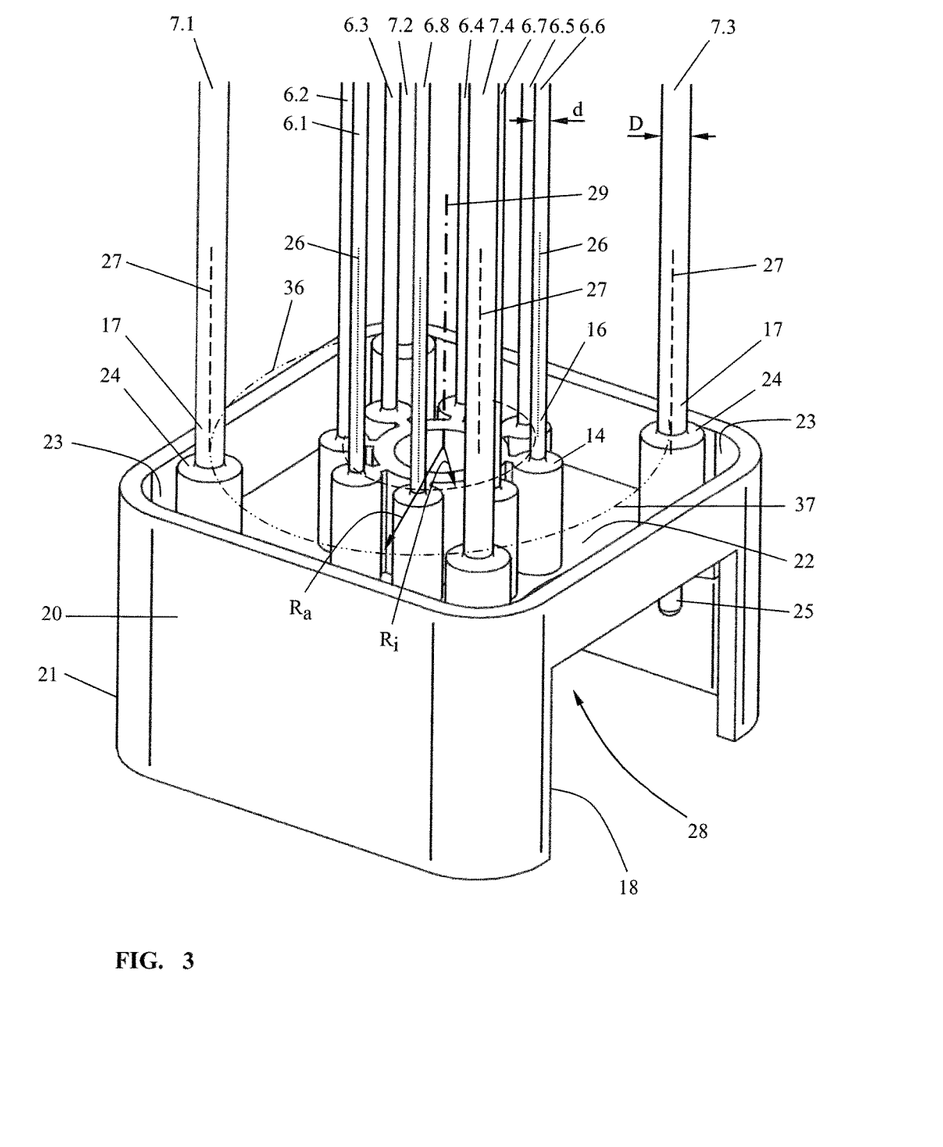
FIG. 3 shows an enlarged representation of the base of the base module, having contact rods fitted to the module.

FIG. 3 shows a central axis 29 of the base module 20; the central axis 29 is arranged in parallel with the longitudinal axes 26 and 27 of the contact rods 6 and 7.

As shown in FIGS. 2 and 3, the contact rods 7.1, 7.2, 7.3 and 7.4 arranged in the housing corners 23 lie on a common diametral circle 37. In an overhead view of the base module 20, the longitudinal axes 27 of the contact rods 7.1, 7.2, 7.3 and 7.4 describe points on the diametral circle 37. In a corresponding manner, the longitudinal axes 26 of the inner contact rods 6.1, 6.2, 6.3, 6.4, 6.5, 6.6, 6.7, 6.8 describe a diametral circle 36.

As shown in FIG. 3, the outer contact rods 7.1, 7.2, 7.3, 7.4 are arranged with an equal outer radial clearance Ra to the central axis 29. Correspondingly, the inner contact rods 6.1, 6.2, 6.3, 6.4, 6.5, 6.6, 6.7 and 6.8 have an inner radial clearance Ri to the central axis 29. Preferably, the outer radial clearance Ra is greater than the inner radial clearance Ri. The diametral circle 37 of the outer contact rods 7.1, 7.2, 7.3, 7.4 is thus larger than the diametral circle 36 of the inner contact rods 6.1, 6.2, 6.3, 6.4, 6.5, 6.6, 6.7 and 6.8. Preferably, the inner diametral circle 36 is coaxially arranged within the outer diametral circle 37.

Figure 5:
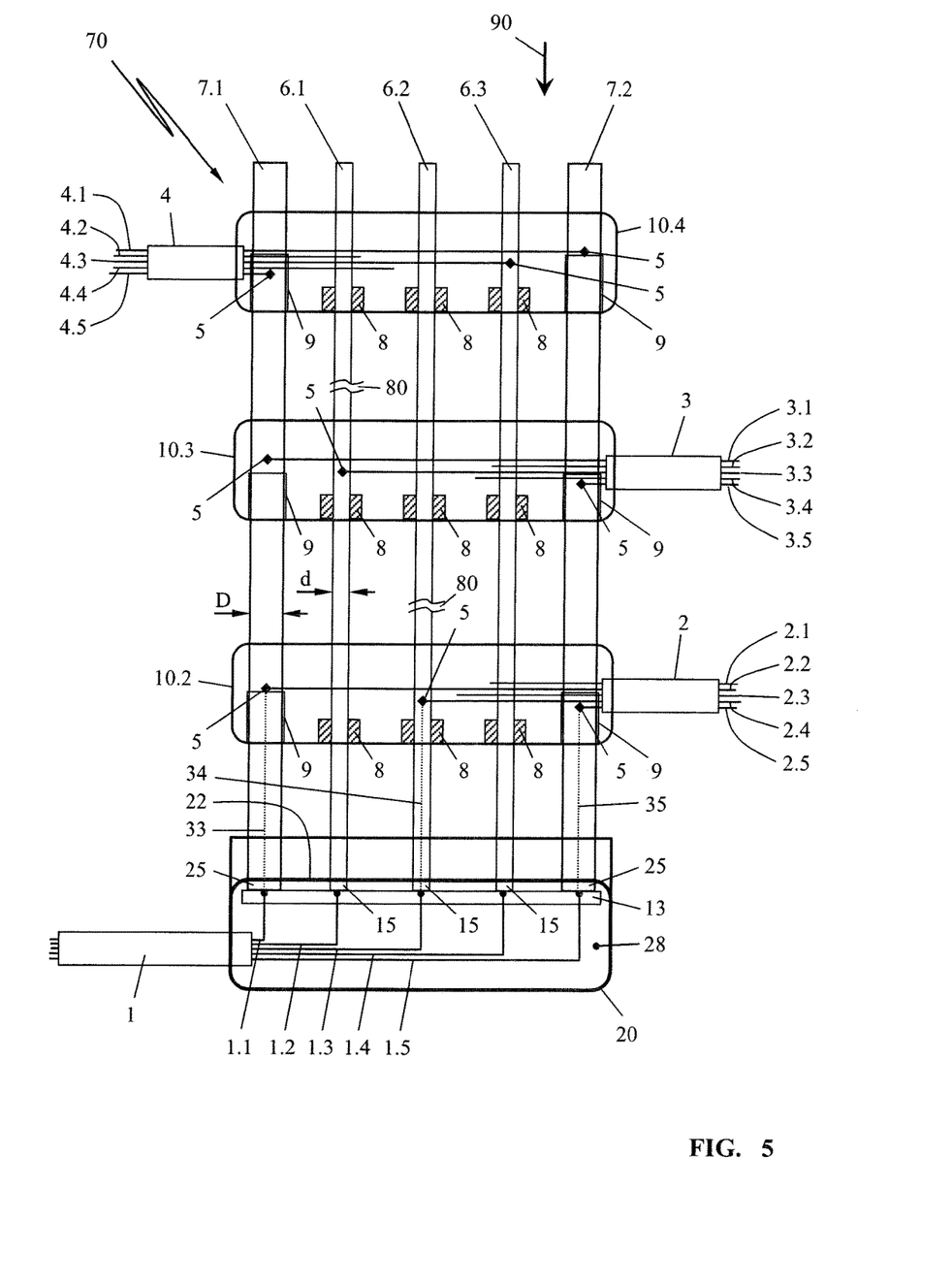
FIG. 5 shows a schematic of the distributor according to FIG. 1 having a base module, connecting modules, incoming lines and outgoing lines.

In the embodiment shown, the base module 20 has a multi-core incoming conductor as the first conductor 1. In FIG. 5, for exemplary purposes, five cores 1.1, 1.2, 1.3, 1.4 and 1.5 of the incoming first conductor 1 are represented. In this arrangement, the individual cores 1.1 to 1.5 of the first conductor 1 are bonded with the contact rods 6 or 7; in the schematic embodiment, bonding with the contact rods 7.1, 7.2, and with the contact rods 6.1, 6.2 and 6.3 is represented. Appropriately, the ends 15 or 25 of the contact rods represented are bonded with a contact plate 13 below the base 22. Via the contact plate 13, the ends 15 and 25 of all the contact rods 6, 7, in FIG. 5 of the contact rods 7.1, 7.2, 6.1, 6.2, 6.3 represented, are electrically connected to cores 1.1, 1.2, 1.3, 1.4, 1.5 of the incoming first conductor 1.

As can clearly be seen in FIG. 5, the diameters D of the outer contact rods 7.1, 7.2, 7.3, 7.4 (FIGS. 2, 3) are configured to a larger diameter D than that of the inner contact rods 6.1, 6.2, 6.3, 6.4, 6.5, 6.6, 6.7, 6.8 (FIGS. 2, 3); the inner contact rods 6 have a smaller diameter d.

The contact rods 6 and 7 are formed from an electrically-conductive material; it can be sufficient if the contact rods 6 and 7 are provided with an electrically-conductive surface, which can be employed for the purposes of bonding. The inner contact rods 6 of smaller diameter d appropriately form electric signal lines. The outer contact rods 7 of larger diameter D specifically form electric power supply conductors.

Figure 4:
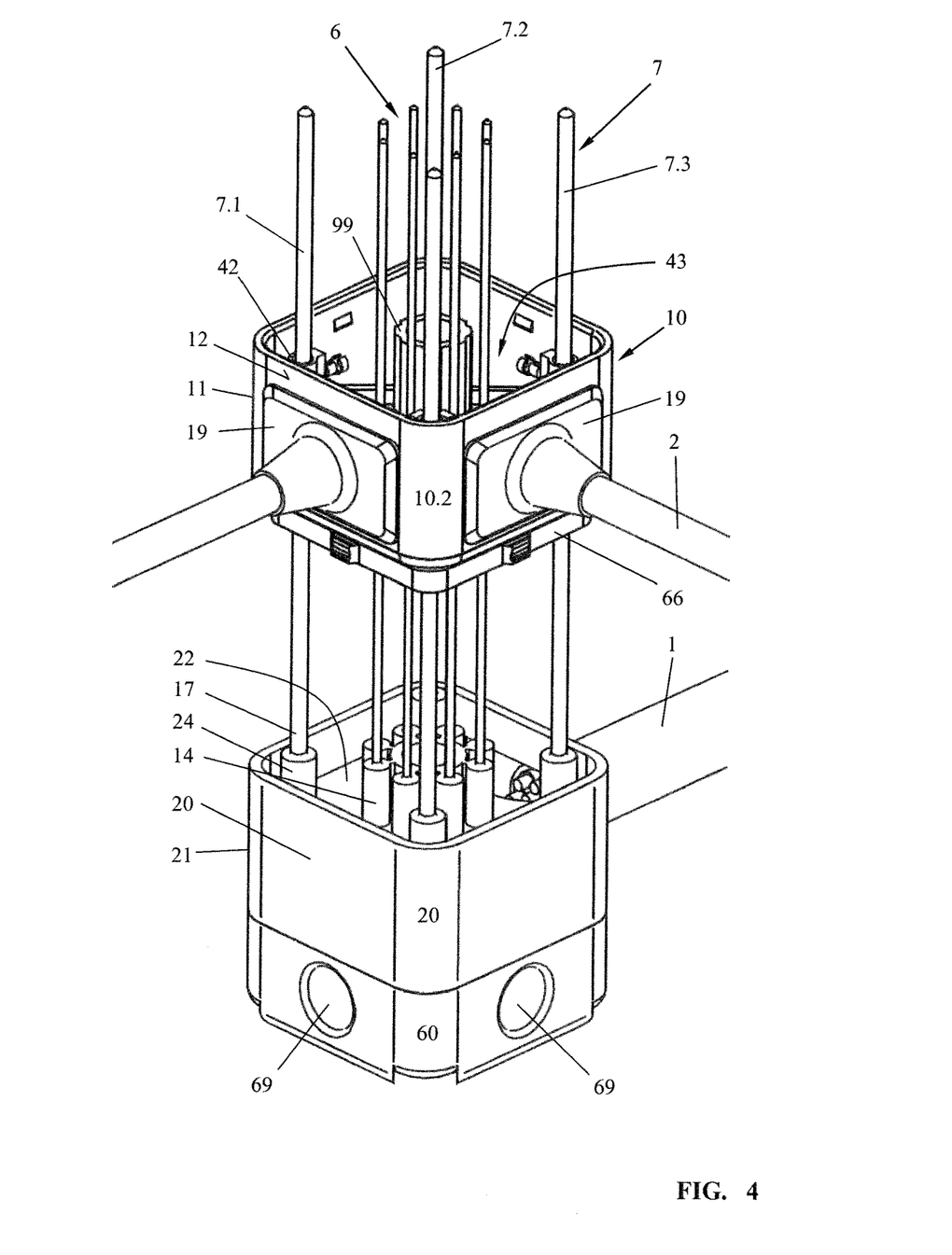
FIG. 4 is a perspective view of a base module having contact rods and a connecting module threaded thereupon, in an intermediate position.
Figure 6:
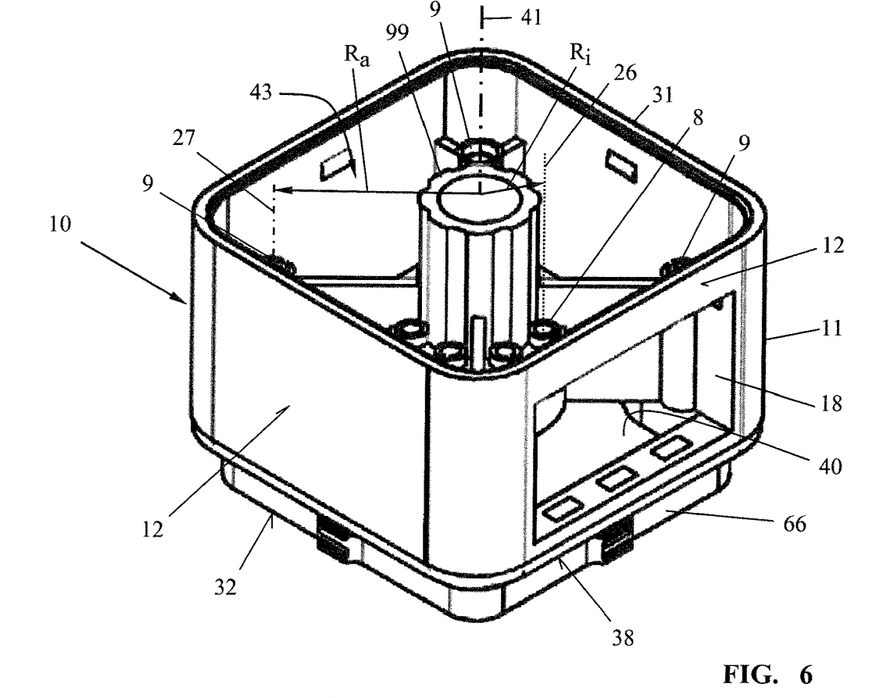
FIG. 6 is a perspective representation of the housing of a connecting module.

As shown in FIGS. 4 and 5, one or more connecting modules 10.2, 10.3, 10.4 are threaded onto the contact rods 6, 7. To this end—as shown in FIG. 6—the connecting module 10 is configured as a housing 11 which, in at least one housing side 12, incorporates a receiving window 18 for the connection of a connecting element 19. Examples of connecting elements are represented in FIGS. 9 to 13.

In the embodiment represented, the housing 1 of a connecting module 10.1, 10.2, 10.3, 10.4, 10.5, in at least one housing side 12, incorporates a receiving window 18 for the accommodation of a connecting element 19, wherein the connecting element 19 is already fitted to the connecting module 10.1, 10.2, 10.3, 10.4, 10.5 during the production process. Essentially, a connecting module 10.1, 10.2, 10.3, 10.4, 10.5 which is configured for installation in a tower is provided with a connecting line, a screw connection 46 for a connecting line and/or a plug-in connector 47 for a connecting line. In another configuration, the connecting modules 10.1, 10.2, 10.3, 10.4, 10.5 can be configured such that a receiving window 18 for a connecting element 19 is provided as a push-out surface, thereby permitting a user to determine the position of the receiving window 18 on the connecting module 10.1, 10.2, 10.3, 10.4, 10.5, and the number of receiving windows 18 to be opened, in situ.

The housing 11 of the connecting module 10 is configured as a cup-type or pot-type housing 43 having a base 40. According to the arrangement of the contact rods 6 and 7 on the base module 20, the housing 11 is provided with guide sleeves 8 and 9. The guide sleeves 8 and 9 are arranged perpendicularly on the base 40, wherein the guide sleeves 8 are arranged with a radial clearance Ri around a central axis 41 of the connecting module 10. Correspondingly, the guide sleeves 9 in the corners of the housing 11 are arranged with a radial clearance Ra to the central axis 41 of the connecting module 10. Appropriately, the cup-type housing has a central support dome 99. The support dome 99 can be configured such that, upon the screw fixing of the tie-rod, a supporting element is provided.

If—as shown in FIG. 4—a connecting module 10.2 is threaded onto the contact rods 6, 7, the inner contact rods 6 are routed through the guide sleeves 8 and the outer contact rods 7 are routed through the guide sleeves 9. Advantageously, the guide sleeves 8 and 9 are displaceably mounted on the contact rods 6 and 7. The guide sleeves 9 of the outer contact rods 7 can advantageously be configured as contact clamps 42, or contact clamps 42 can be fitted in corresponding recesses in the guide sleeves 9.

As shown in FIG. 4, the contact rods 6 and 7 project through the connecting module 10.2; FIG. 5 shows how at least one of these contact rods 6 or 7 projects through a plurality of connecting modules 10.2, 10.3, 10.4. Advantageously, a contact rod 6, 7 projects through a connecting module 10, regardless of whether the contact rod is bonded or otherwise. It can be appropriate for a bonded contact rod to be capped, as represented in FIG. 5. In all cases, a section break 80 is arranged wherever a contact point 5 has been formed. Appropriately, the contact rods 6 are only routed as far as the connecting module 10 in which they are bonded. Down-circuit of the contact module, the contact rods 6 can be trimmed.

Figure 16:
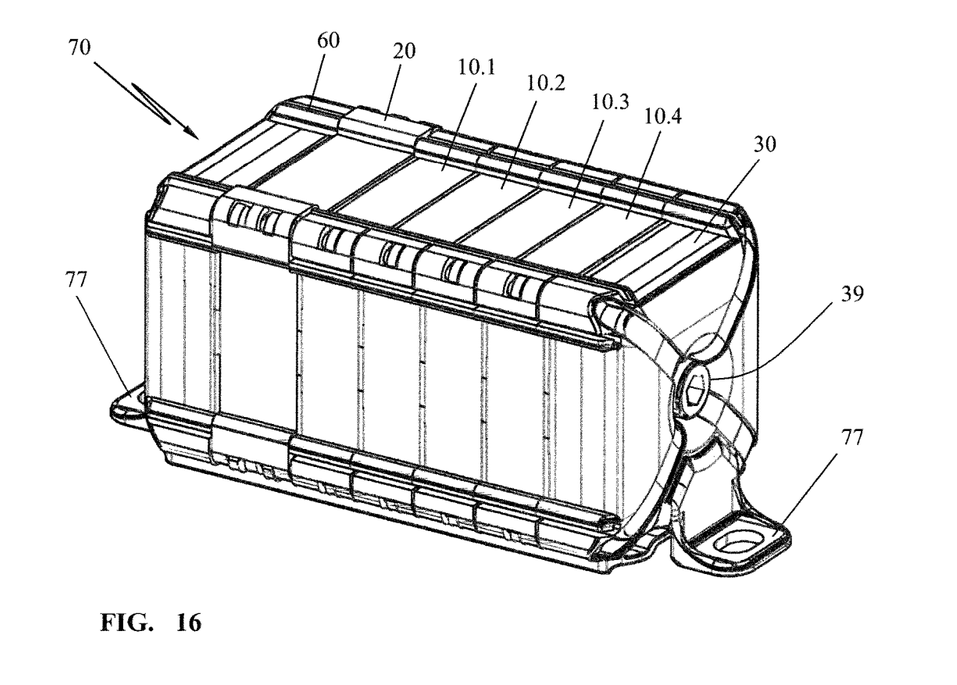

The arrangement of the connecting module 10 on the contact rods (FIG. 5) itself forms a mechanical guide for the connecting modules, such that the latter—routed on the contact rods 6 and 7—can be displaced downwards in the direction of the arrow 90 to the bearing position on the base module 20. Advantageously, a base module can additionally be provided with further fixing holes and/or a guide rail. A horizontal tower—as represented in FIG. 16—or even a vertical tower can be attached for example, via a fixing flange 77 on the cover module 30 and/or on the pedestal module 60 to a base surface, for the purposes of mounting for example, on a wall or on a floor.

In an overhead view, the connecting modules 10 and the base module 20, and specifically also the cover module 30 and the pedestal module 60, have the same geometrical shape. As a result, a quadratic shape is appropriate.

In conjunction with the quadratic shape, and the arrangement of the inner contact rods 6 and the outer contact rods 7 in a rotationally-symmetrical position through an angle of 90°, it is possible for each connecting module to be threaded onto the base module 20 offset by rotation through an angle of 90°. The connecting elements 19 provided on a connecting module 10 can, in a simple manner, be arranged in situ in an appropriate position for cabling.

The contact rods 7.1, 7.2, 7.3, 7.4 are arranged in a circumferential direction around the central axis 29 of the base module 20, with a mutual angular spacing of 90°. The contact rods 6.1, 6.2, 6.3, 6.4, 6.5, 6.6, 6.7, 6.8 are arranged in a circumferential direction around the central axis 29, with a mutual angular spacing of 45°.

As shown in FIG. 5, the modular distributor 70 for incoming and outgoing electrical conductors 1, 2, 3, 4 includes at least the base module 20, having a first electrical conductor 1 as the incoming conductor, and at least one connecting module 10, having a second electrical conductor 2 as an incoming and/or outgoing electrical conductor.

In the embodiment, the contact rods 6 and 7 of the base module project through each connecting module 10. A connecting module 10 is threaded onto the contact rods 6, 7 in the correct position via the guide sleeves 8 and 9. The contact rods 6 and 7 thus project through the connecting module 10, wherein—as shown in FIG. 5—an for example, 5-core outgoing conductor 2 having the cores 2.1, 2.2, 2.3, 2.4 and 2.5, by at least some of its cores, is bonded with a number of cores 1.1, 1.2, 1.3, 1.4 and 1.5 of the incoming conductor 1 of the base module 20, via the contact rods 6 or 7. In FIG. 5 it is shown that the contact rod 7.1 forms the electrical connection 33 between a first core 1.1 of the first conductor 1 and a second core 2.2 of the second conductor 2. In a corresponding manner, the contact rod 6.1 forms an electrical connection 34 between a second core 1.2 of the first conductor 1 and a fourth core 2.4 of the second conductor 2 on the connecting module 10.2. Via a third electrical connection 35, a fifth core 1.5 of the incoming first electrical conductor 1 is connected with a fifth core 2.5 of the second conductor 2 on the connecting module 10.2.

Via the contact rods 7.1 and 7.2, a supply voltage can be switched to the second conductor 2; via the contact rod 6.1, a signal connection is formed, such that for example, a sensor or similar can be operated on the conductor 2.

The housing 11 of a connecting module 10 is configured as an open cup-type housing 43, wherein the electrical contact point 5 of one core 2.1, 2.2, 2.3, 2.4, 2.5 of the second conductor 2 of the connecting module 10 with one of the contact rods 6, 7 lies within the cup-type housing. As specifically shown in FIG. 1, the cup-type housing 43 of a connecting module 10.2 is closed by the next adjoining connecting module 10.3 on the contact rod 6, 7; advantageously, the cup-type housing 43 is closed by the base 40 of a next adjoining connecting module 10.3 on the contact rod 6, 7.

In the embodiment represented, a seal 66 is arranged between the housing edge 31 of the cup-type housing 43 and the opposing edge 32 of the base 40. In a simple manner, this seal can be configured as an O-ring, which ensures the provision of a radial seal between the adjoining connecting modules. In another configuration, as specifically represented in FIG. 6, the seal 66 can advantageously show an L-shape in cross-section. The edge 32 of the seal 66 projects into the housing edge 31 of a connecting module 10, as a result of which the housing edge 31 of an adjoining connecting module is seated on a circumferential shoulder 38 of the seal 66. An effective axial seal is achieved, wherein the tensile force applied via the tie-rod 61 ensures the provision of a secure seal; moreover, a radial seal can be achieved by the projection of the seal 66 into the housing edge 31.

In a simple configuration of the seal 66, the latter can be configured as an axial expanded foam seal. A seal of this type can be permanently bonded to the connecting module. Advantageously, the axial expanded foam seal can be formed in conjunction with the manufacture of the connecting module.

Figure 7:
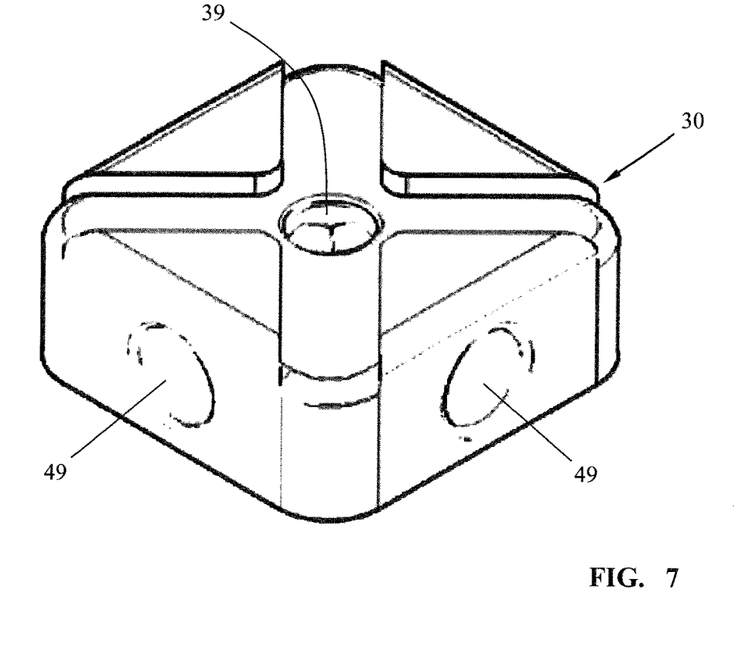
FIG. 7 is a perspective representation of a cover module of the distributor according to FIG. 1.

The cover module 30 is a simple closure module having a central opening 39 for the tie-rod 61. Appropriately, push-out surfaces 49 can be provided in the side walls of the cover module for the connection of further cables, specifically for the purposes of an electrical loop-through to an adjoining distributor.

Figure 8:
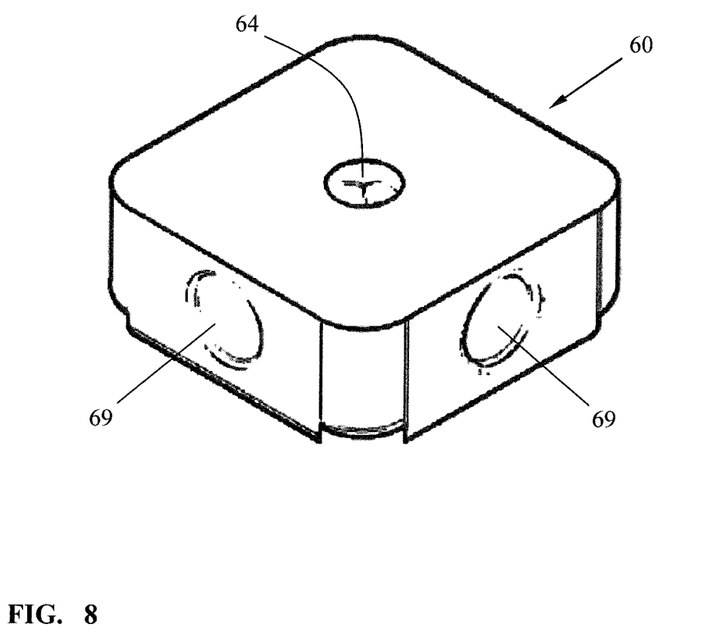
FIG. 8 is a perspective representation of a plinth module of the distributor according to FIG. 1.

In a corresponding manner, a central opening 64 is provided in the pedestal module 60 (FIG. 8) for the routing of the tie-rod 61. The lateral surfaces of the pedestal element can also be provided with push-out surfaces 69 for the guidance of conductors.

Advantageously, a pedestal module 60 or a cover module 60 is provided with no connecting line. The pedestal module 60 or a cover module 60 can advantageously be configured as a self-closing module. Alternatively, the pedestal module 60 or a cover module 60 can be configured with a prefabricated connecting line and/or with a plug-in connector and/or with a clamping terminal and/or with a plug-in terminal.

The connecting elements 19 to be fitted to the receiving window 18 of a connecting module 10 can be of differing configurations, and specifically adapted to the respective application, as represented in FIGS. 9 to 13. A connecting element 19 of this type has a base plate 44, which is correspondingly configured for insertion in the receiving window 18. The base plate 44 can be of rigid configuration, or can be formed of an elastic material.

Figure 9:
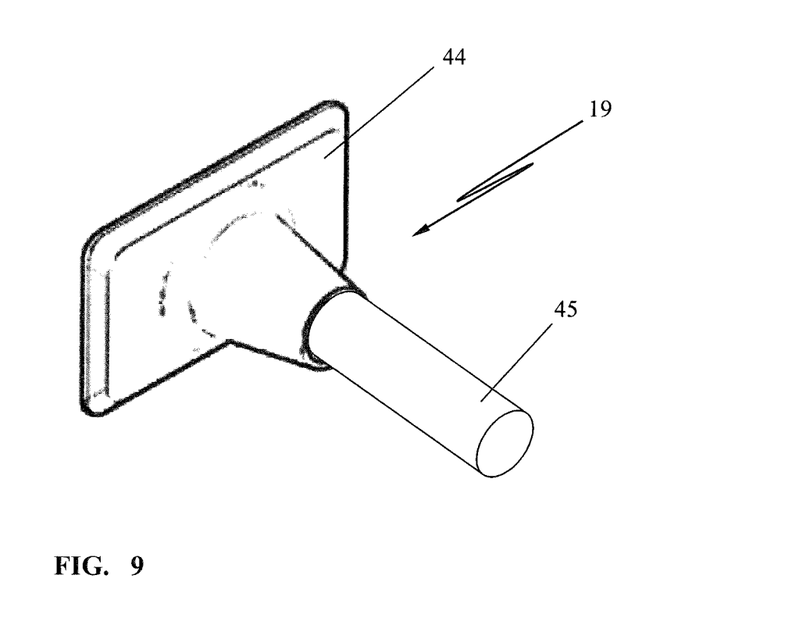
FIG. 9 shows a connecting element with a molded-in conductor.

The connecting element according to FIG. 9 is attached to one end of a source conductor 45 in a fixed arrangement. Connecting elements 19 of this type are prefabricated accordingly.

Figure 10:
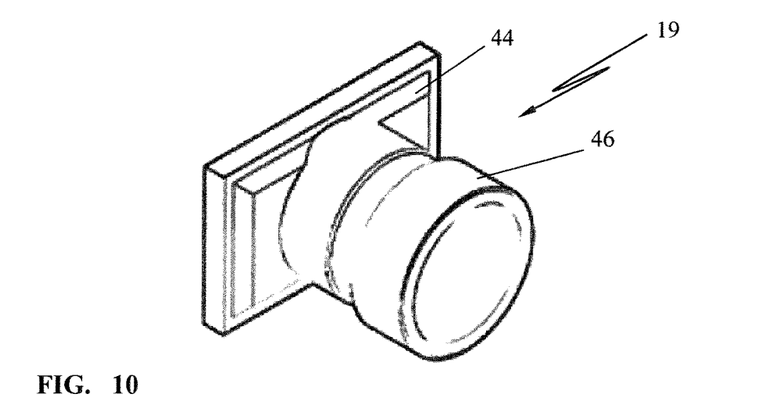
FIG. 10 is a perspective representation of a connecting element with a cable screw connection.

The connecting element 19 according to FIG. 10 has a cable screw connection 46, which is arranged on a corresponding base plate 44. A cable screw connection of this type is employed for the connection of any conductors required; by the tightening of the cable screw connection 46, a tightly-secured seating of the incoming or outgoing conductor is achieved.

Figure 11:
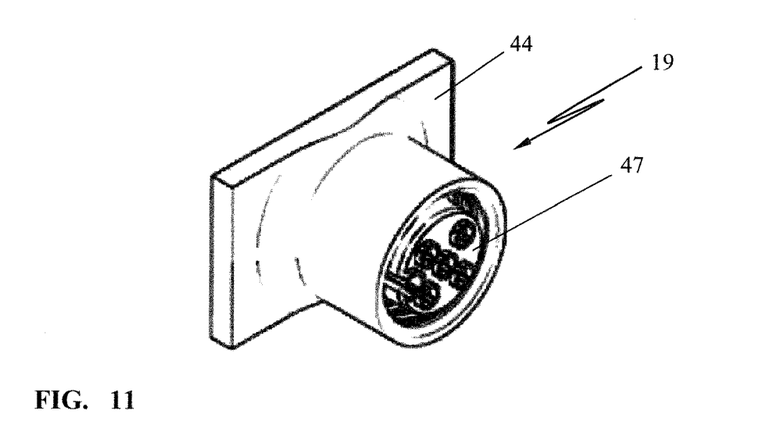
FIG. 11 shows a connecting element with a circular plug connector.

The connecting element 19 according to FIG. 11 has a circular plug connector 47 as a socket. Plugs on correspondingly prefabricated conductors can be connected hereto in a simple manner.

Figure 12:
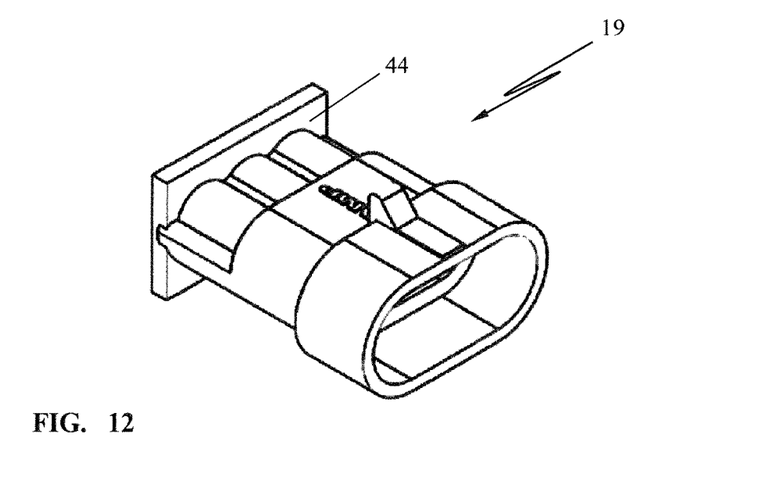
FIG. 12 is a perspective representation of a connecting element configured as a Superseal plug-in connector.
Figure 13:
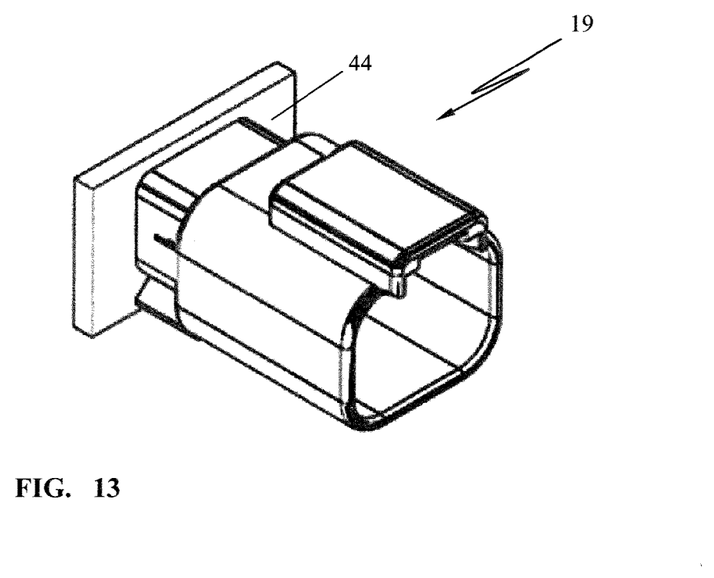
FIG. 13 is a perspective representation of a Deutsch plug-in connector.

FIGS. 12 and 13 show connecting elements in accordance with different standards: the plug-in connector represented in FIG. 12 corresponds to a "Superseal" plug-in connector; FIG. 13 represents a connection known as a "Deutsch plug-in connector".

Figure 14:
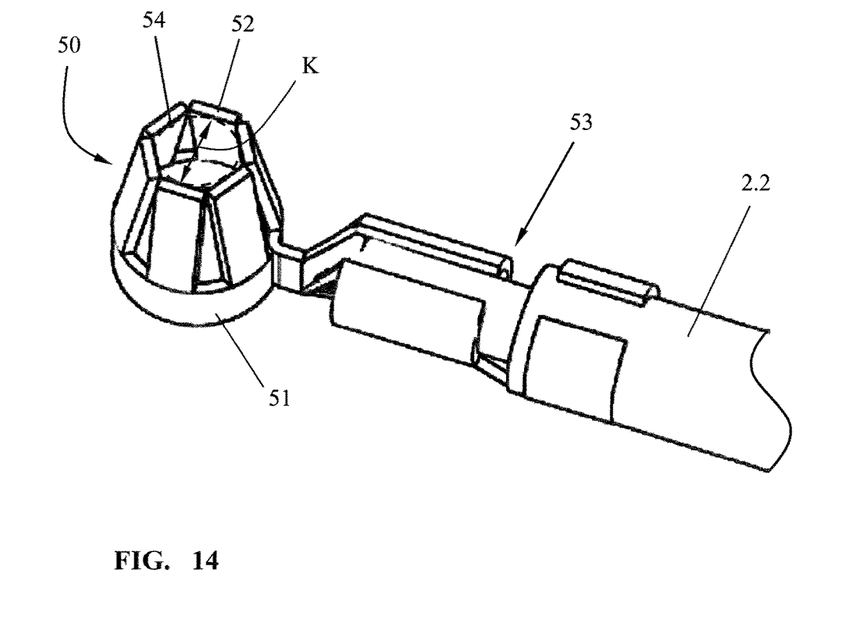
FIG. 14 is a perspective representation of a spring contact clamp having a crimp connector for connection with a conductor core.

The cores 2.1 to 2.5, 3.1 to 3.5 or 4.1 to 4.5 of the conductors 2, 3, 4 on the connecting modules 10.2, 10.3, 10.4 are appropriately electrically bonded via spring contact clamps 50 with selected contact rods 6.1, 6.2, 6.3, 6.4, 6.5, 6.6, 6.7, 6.8, 7.1, 7.2, 7.3, 7.4. The spring contact clamp 50 is advantageously configured as a spring-cage connector 51 having a plurality of sprung contact lugs 52. In FIG. 14, the core 2.2 is connected to the contact clamp 50 via a crimp connector 53. The contact clamp 50 encloses a contact rod in an annular manner, wherein the contact clamp 50 is axially fitted onto the contact rod. The contact lugs 52 are pushed back, and thus engage with the contact rod by the application of a spring force. In the resting position represented in FIG. 14, the ends of the contact lugs 52 form a contact circle 54 with a contact diameter K. The configuration of the contact clamp 50 is configured such that the contact diameter K is smaller than the diameter d of a contact rod 6; if the contact element is to be bonded with a contact rod 7, it is sufficient if the contact diameter K is configured to a smaller dimension than the diameter D of the contact rod 7. Appropriately, the contact diameter K is configured to a smaller dimension than the smaller diameter d of the contact rod 6.

Figure 15:
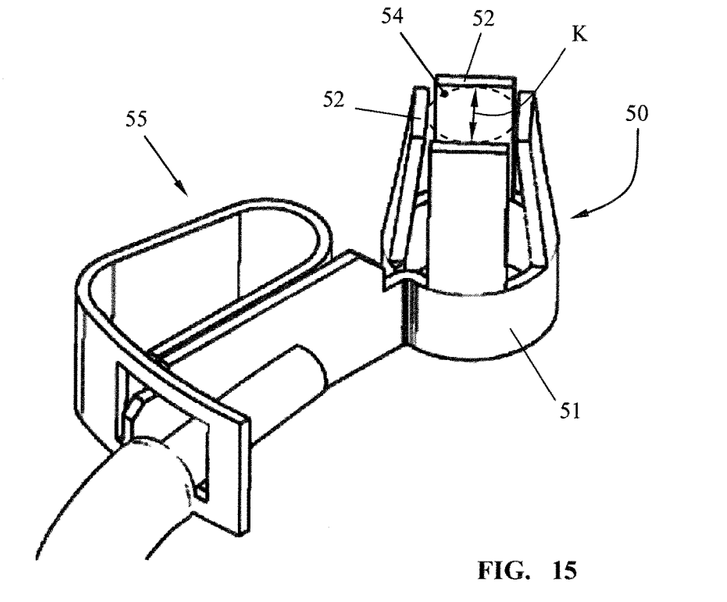
FIG. 15 is a perspective representation of a contact clamp having a spring contact for connection with a conductor core; and, FIG. 16 is a perspective view of a distributor in the form of a horizontal tower, with optional fixing flanges.

In the embodiment shown in FIG. 15, the contact clamp 50, in principle, is of the same configuration as the contact clamp 50 represented in FIG. 14. Whereas the contact clamp 50 in FIG. 14 has six contact lugs 52, the simplified contact clamp 50 in FIG. 15 has only four contact lugs 52, which also describe a contact circle 54. The diameter of the contact circle K is smaller than the diameter D of a contact rod 7, and preferably smaller than the diameter d of a contact rod 6.

In FIG. 15, the cores 2.2 of a conductor 2 are interchangeably connected via a spring clamp 55. The contact clamp 50 according to FIG. 14 is preferably configured for prefabricated cables, whereas the contact clamp 50 according to FIG. 15 is configured for the connection of any chosen conductors.

FIG. 16 shows a schematic representation of a horizontal distributor tower or distribution board 70, having four connecting modules 10.1, 10.2, 10.3, 10.4. The cover module 30 has at least one fixing flange 77, which is provided for attachment to a base surface. Accordingly, the pedestal module 60 may have a fixing flange 77. Appropriately, the fixing flanges 77 of the pedestal module 60 and the cover module 30 are arranged on one side of the distributor; by displacing the mounting of the pedestal module 60 and/or of the cover module 30 through an angle of 90°, the position of the fixing flange 77 can be appropriately selected for the site of application.

Via the fixing flanges 77, the distributor 70 or distributor tower can be fitted, whether lying or standing, in any required horizontal or vertical position.

It is understood that the foregoing description is that of the preferred embodiments of the invention and that various changes and modifications may be made thereto without departing from the spirit and scope of the invention as defined in the appended claims.

What is claimed is:

1. A modular distributor for incoming and outgoing electrical lines, the modular distributor comprising:
   a base module having a first electrical line;
   a connecting module having a second electrical line;
   the modular distributor being a composite of said base module and said connecting module;
   said first electrical line having a first core;
   said second electrical line having a second core;
   said first core of said first electrical line being contacted to said second core of said second electrical line in the modular distributor so as to form an electrical connection;
   said base module having at least two contact rods;
   said connecting module being configured to be fitted on said contact rods in such a manner so as to cause said contact rods to project through said connecting module;
   said connecting module having a housing with a guide sleeve;
   said guide sleeve being configured to be held in an axially displaceable manner on one of said contact rods;
   said housing having at least one guide sleeve configured as a contact clamp;
   one of said at least two contact rods being configured to form said electrical connection between said first core of said first electrical line and said second core of said second electrical line;
   said at least two contact rods being arranged around a central axis such that for a rotational position of said connecting module a rotational symmetry is given through a respective angle of 90° in such a manner that said connecting module can be accurately positioned onto said contact rods in positions offset by 90°.

2. The modular distributor of claim 1, wherein said connecting module is mechanically guided on at least one of said at least two contact rods.

3. The modular distributor of claim 1, wherein the modular distributor comprises a multiplicity of connecting modules; and, at least one of said at least two contact rods projects through a plurality of said multiplicity of connecting modules.

4. The modular distributor of claim 1, wherein:
   said housing of said connecting module is formed as a pot-type housing having a base; and, said second core of said second electrical line is configured to form an electrical contact with said one of said at least two contact rods within said pot-type housing.

5. The modular distributor of claim 1, wherein said connecting module is a first connecting module, the modular distributor further comprising:
   a second connecting module arranged sequentially with and adjacent to said first connecting module; and,
   a seal arranged between said first connecting module and said second connecting module.

6. The modular distributor of claim 1, wherein said housing of said connecting module has a plurality of housing sides and a receiving window in at least one of said housing sides.

7. The modular distributor of claim 1, wherein:
   said second core of said second electrical line is electrically connected to one of said at least two contact rods via a resilient contact clamp; and,
   said resilient contact clamp is configured to be held on the corresponding one of said at least two contact rods in an axially displaceble manner.

8. The modular distributor of claim 7, wherein said resilient contact clamp is a spring-cage connector configured to have one of said at least two contact rods project therethrough.

9. The modular distributor of claim 1 further comprising:
   a contact plate;
   said base module having a base;
   said at least two contact rods each having first ends and being held on said base of said base module; and,
   said first electrical line having a plurality of first cores configured to be connected to said first ends of said at least two contact rods below said base via said contact plate.

10. The modular distributor of claim 1, wherein:
    the modular distributor comprises a plurality of inner contact rods and a plurality of outer contact rods;
    said base module has a base and defines a central axis;
    said outer contact rods define an outer radial distance $R_a$ to said central axis;
    said inner contact rods define an inner radial distance $R_i$ to said central axis; and,
    said inner radial distance $R_i$ is smaller than said outer radial distance $R_a$.

11. A modular distributor for incoming and outgoing electrical lines, the modular distributor comprising:
    a base module having a first electrical line;
    a connecting module having a second electrical line;
    said first electrical line having a first core;
    said second electrical line having a second core;
    said first core of said first electrical line being contacted to said second core of said second electrical line so as to form an electrical connection;
    at least two contact rods;
    said connecting module being configured to be fitted on said contact rods;
    said contact rods being configured to project through said connecting module;
    said connecting module having a housing with a guide sleeve;
    said guide sleeve being configured to be held in an axially displaceable manner on one of said contact rods;
    said housing having at least one guide sleeve configured as a contact clamp;
    one of said at least two contact rods being configured to form said electrical connection between said first core of said first electrical line and said second core of said second electrical line;
    said housing of said connecting module being formed as a pot-type housing having a base; and,
    said second core of said second electrical line being configured to form an electrical contact with said one of said at least two contact rods within said pot-type housing.

12. The modular distributor of claim 11, wherein said connecting module is a first connecting module and said base is a first base, the modular distributor further comprising:
    a second connecting module having a second base and being arranged adjacent to said first connecting module; and,
    said pot-type housing of said first connecting module being closed by said base of said second connecting module.

13. A modular distributor for incoming and outgoing electrical lines, the modular distributor comprising:
    a base module having a first electrical line;
    a connecting module having a second electrical line;
    said first electrical line having a first core;
    said second electrical line having a second core;
    said first core of said first electrical line being contacted to said second core of said second electrical line so as to form an electrical connection;
    at least two contact rods;
    said connecting module being configured to be fitted on said contact rods;
    said contact rods being configured to project through said connecting module;
    said connecting module having a housing with a guide sleeve;
    said guide sleeve being configured to be held in an axially displaceable manner on one of said contact rods;
    said housing having at least one guide sleeve configured as a contact clamp;
    one of said at least two contact rods being configured to form said electrical connection between said first core of said first electrical line and said second core of said second electrical line;
    a contact plate;
    said base module having a base;
    said at least two contact rods each having first ends and being held on said base of said base module; and,
    said first electrical line having a plurality of first cores configured to be connected to said first ends of said at least two contact rods below said base via said contact plate.

14. A modular distributor for incoming and outgoing electrical lines, the modular distributor comprising:
    a base module having a first electrical line;
    a connecting module having a second electrical line;
    said first electrical line having a first core;
    said second electrical line having a second core;
    said first core of said first electrical line being contacted to said second core of said second electrical line so as to form an electrical connection;
    at least two contact rods;
    said connecting module being configured to be fitted on said contact rods;
    said contact rods being configured to project through said connecting module;

said connecting module having a housing with a guide sleeve;
said guide sleeve being configured to be held in an axially displaceable manner on one of said contact rods;
said housing having at least one guide sleeve configured as a contact clamp;
one of said at least two contact rods being configured to form said electrical connection between said first core of said first electrical line and said second core of said second electrical line;
wherein the modular distributor comprises a plurality of inner contact rods and a plurality of outer contact rods;
said base module having a base and defining a central axis;
said outer contact rods defining an outer radial distance $R_a$ to said central axis;
said inner contact rods defining an inner radial distance $R_i$ to said central axis; and,
said inner radial distance $R_a$ being smaller than said outer radial distance $R_i$.

15. The modular distributor of claim 14, wherein:
each of said inner contact rods defines a first longitudinal axis;
each of said outer contact rods defines a second longitudinal axis; and,
one of said first longitudinal axes and said second longitudinal axes is disposed on a common diameter circle.

16. The modular distributor of claim 14, wherein:
said inner contact rods are configured to form electrical signal lines; and,
said outer contact rods are configured to form electrical supply lines.

* * * * *